Sept. 29, 1959
B. A. BUSS
2,906,042
IRONING MACHINE
Filed May 3, 1957
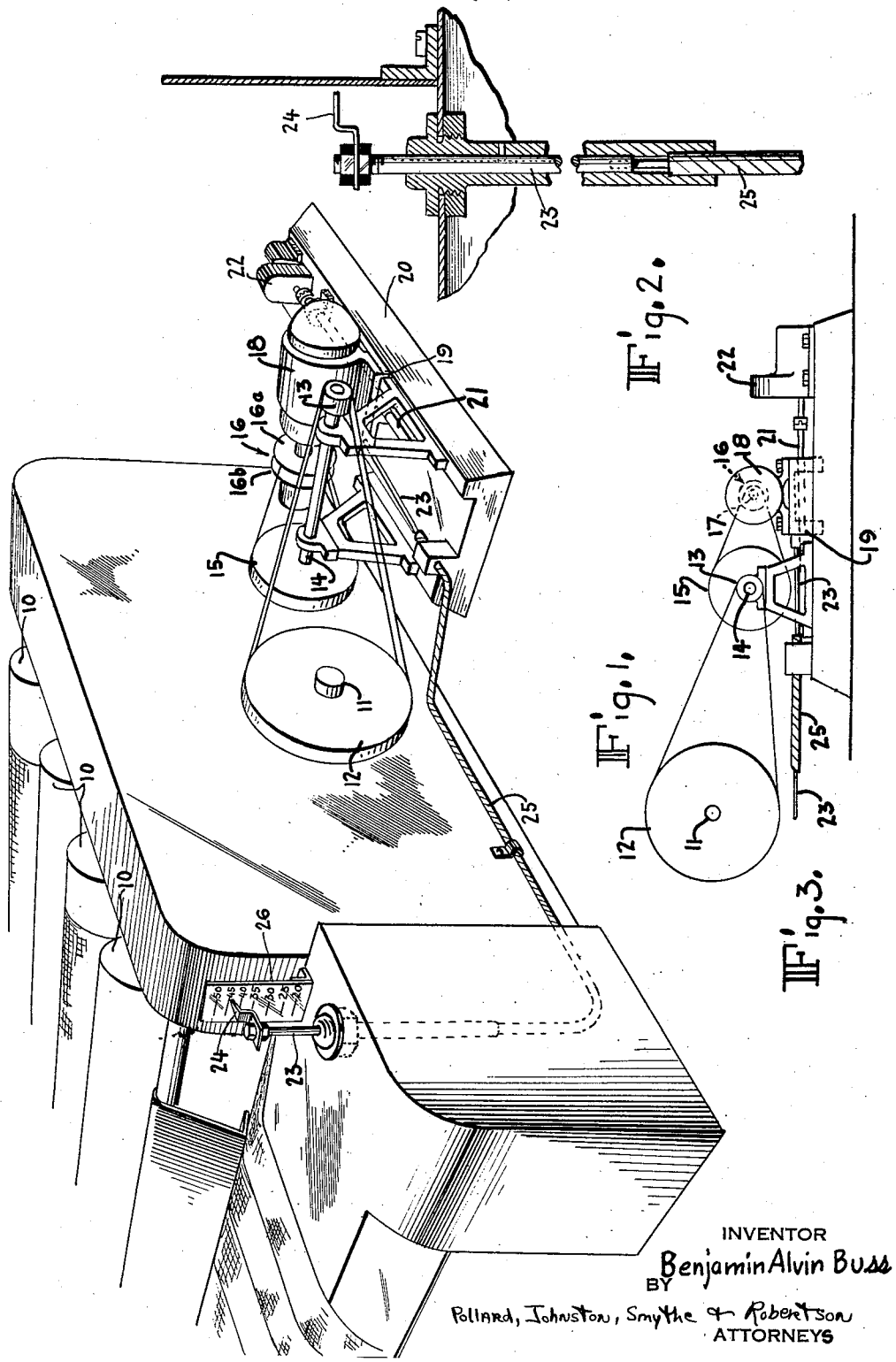
INVENTOR
Benjamin Alvin Buss
BY
Pollard, Johnston, Smythe & Robertson
ATTORNEYS

United States Patent Office

2,906,042
IRONING MACHINE

Benjamin Alvin Buss, East Moline, Ill., assignor to American Machine and Metals, Inc., East Moline, Ill., a corporation of Delaware Application May 3, 1957, Serial No. 656,914

2 Claims. (Cl. 38—48)

This invention relates to commercial ironing machines having a plurality of interconnected rotatable rolls, and particularly to an ironing machine having means for indicating the rotational speed of the rolls.

It is an object of this invention to provide an ironing machine having means for varying the speed of the rolls and means for indicating the rotational speed of said rolls at a given instant.

It is another object of this invention to provide a novel indicating device for showing the rotational speed of the rollers in a commercial ironer employing a variable speed motor pulley.

It is a further object of this invention to provide indicating means directly responsive to the movement of a movable driving motor of an ironer having a variable speed pulley.

The indicating mechanism provided according to this invention is utilized in a laundry machine having a plurality of rolls, all of the rolls being driven at the same speed. The combination includes a first rotatable shaft for driving said rolls, a constant speed type motor having a shaft, a variable speed pulley on one of said shafts and rotatable therewith, a second pulley on the other of said shafts, and means connecting said variable speed pulley and said second pulley so that rotary motion imparted to the motor shaft is transmitted to the other shaft. Means are provided for changing the position of said shafts relative to each other so as to vary the speed of rotation of the first shaft. A speed indicator is mounted on the machine and mechanical means responsive to the relative positions of said shafts is provided for indicating on the indicator the rotational speed of the fixedly positioned shaft.

These and other objects, features and advantages of the invention will become apparent from the following detailed description and drawings which are merely exemplary.

In the drawings:

Fig. 1 is a perspective view of the device of the invention;

Fig. 2 is an enlarged view partly in cross section of the indicating assembly; and Fig. 3 is a side view of the driving mechanism.

As shown in Fig. 1, the ironing machine of the invention includes a plurality of ironing rolls 10, each of which is driven at the same speed by rotatable shaft 11 through suitable mechanism (not shown). Mounted on shaft 11 for rotation therewith is a pulley 12 connected by a belt, or other suitable means, to a pulley 13 on jack shaft 14. Pulley 15 is fixed on the other end of jack shaft 14, and is connected to variable speed pulley 16 on the drive shaft 17 of a constant speed type motor 18 for rotation therewith.

The variable speed drive pulley may be of the type known as a "Reeves" drive, having a fixed disc 16a on shaft 17 and a disc 16b axially movable on shaft 17. The two discs are cone-shaped on one side with the cone portions facing each other. Spring means (not shown) constantly urge the two discs together in order to maintain proper belt tension.

In order to vary the speed of the belts and consequently the pulley 12 and the shaft 11, the position of shaft 17 relative to shaft 14 is changed. Thus, the rotational speed of shaft 14 and shaft 11 will be decreased as shaft 17 is moved toward shaft 14, since the pressure exerted by the spring will cause the discs to move closer together and the belt will travel on the pulley about a point nearer the outer periphery of the discs. To increase the rotational speed of shaft 14, shaft 17 is moved away from shaft 14, so that the belt moves radially inwardly toward shaft 17.

In order to permit the movement of shaft 17 relative to shaft 14, motor 18 is mounted on a base 19 which is slidable on a bed 20. A threaded shaft 21 is rotatably mounted at one of its ends in an upwardly extending portion 22 of bed 20, and is threaded in base 19. Rotation of shaft 21 will cause movement of base 19 which carries motor 18 and shaft 17. The rotation of shaft 21 may be manual or through suitable controlled driving means (not shown), or operated by a suitable servomechanism (also not shown).

In order to indicate to the operator of the ironing machine the speed at which the rolls are being driven, an indicating mechanism is provided. This mechanism includes a flexible cable 23 connected at one of its ends to base 19 and at the other of its ends to a pointer 24. The cable 23 may be mounted for sliding movement in a hollow cable 25, or other suitable means. An upstanding plate 26 is mounted on the machine in a position which will be clearly visible to the operator, and has suitable speed indicating indicia thereon. The end of cable 23 carrying pointer 24 is arranged so that the pointer will move along the indicating plate and show the rotatable speed at which the rolls are traveling. Since the cable is connected at its other end to base 19 movement of this base will bring about corresponding movement of the pointer, so that variations in the speed of rotation will immediately be apparent to the operator.

The mechanism described above provides simple means for varying the rotational speed of the rollers of an ironing machine in conjunction with an indicator for showing the variations made immediately, without any complicated mechanism which might break down.

It is to be understood that details of construction can be varied without departing from the spirit of the invention except as defined in the appended claims.

What is claimed is:

1. In a laundry machine having a plurality of rolls, each of which is driven at the same speed as the others, the combination comprising a fixed rotatable shaft for driving all of the rolls, a constant speed type motor having a shaft, a variable speed pulley on said motor shaft and rotatable therewith, said variable speed pulley including two facing cone-shaped discs, one of which is slidable relative the other along said motor shaft, and means urging said discs together, a drive pulley on said fixed shaft, belt means connecting said variable speed pulley and said drive pulley so that rotary motion imparted to the motor shaft is transmitted to the fixed shaft, a bed upon which said motor is mounted, said motor being movable on said bed relative to said fixed shaft, a screw shaft threadingly engaging said motor, said motor moving on said bed relative to said fixed shaft when said screw shaft is rotated so as to vary the distance between said discs of said variable speed pulley and thereby vary the speed of rotation of said fixed shaft, means for rotating said screw shaft selectively in either direction, the speed of rotation of said fixed shaft being decreased as said motor is moved closer to said fixed shaft and said discs move toward each other, a speed indicating panel on said machine spaced a substantial distance from said motor, a cable having one end directly connected to said motor so that as said motor is moved said cable moves, and a pointer directly connected to the other end of said cable and movable on said speed indicating panel so that as said motor is moved to vary the rotational speed of said fixed shaft, said pointer moves the same distance on said speed indicating panel to indicate thereon the rotational speed of said fixed shaft.

2. In a laundry machine having a plurality of rolls, each of which is driven at the same speed as the others, the combination comprising a fixed rotatable shaft for driving all of the rolls, a constant speed type motor having a shaft, a variable speed pulley on said motor shaft and rotatable therewith, said variable speed pulley including two facing cone-shaped discs, one of which is slidable relative the other along said motor shaft, and means urging said discs together, a drive pulley on said fixed shaft, belt means connecting said variable speed pulley and said drive pulley so that rotary motion imparted to the motor shaft is transmitted to the fixed shaft, a bed upon which said motor is mounted, said motor being movable on said bed relative to said fixed shaft so as to vary the distance between said discs of said variable speed pulley and thereby vary the speed of rotation of said fixed shaft, means for activating said motor moving means selectively in either direction, the speed of rotation of said fixed shaft being decreased as said motor is moved closer to said fixed shaft and said discs move inwardly relative to each other, a speed indicating panel on said machine spaced from said motor, a cable having one end directly connected to said motor so that as said motor is moved said cable moves, and a pointer connected to the other end of said cable and movable on said speed indicating panel so that as said motor is moved to vary the rotational speed of said fixed shaft, said pointer moves a proportionate distance on said speed indicating panel to indicate thereon the rotational speed of said fixed shaft.

References Cited in the file of this patent

UNITED STATES PATENTS

| | | |
|---|---|---|
| 191,997 | Ostermoor | June 12, 1877 |
| 1,669,699 | Edwards | May 15, 1928 |
| 2,193,212 | Vincent | Mar. 12, 1940 |
| 2,201,357 | Twomley | May 21, 1940 |
| 2,245,392 | Drill | June 10, 1941 |
| 2,257,744 | Heyer | Oct. 7, 1941 |
| 2,382,935 | Armitage | Aug. 14, 1945 |